US007144453B2

(12) United States Patent
Yim et al.

(10) Patent No.: US 7,144,453 B2

(45) Date of Patent: Dec. 5, 2006

(54) COMPOSITION FOR PREPARING POROUS DIELECTRIC THIN FILM CONTAINING SACCHARIDES POROGEN

(75) Inventors: Jin Heong Yim, Daejeon-Shi (KR); Yi Yeol Lyu, Daejeon-Shi (KR); Jung Bae Kim, Gyeonggi-Do (KR); Kwang Hee Lee, Gyeonggi-Do (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 100 days.

(21) Appl. No.: 10/694,942

(22) Filed: Oct. 29, 2003

(65) Prior Publication Data

US 2004/0121139 A1 Jun. 24, 2004

(30) Foreign Application Priority Data

Oct. 29, 2002 (KR) ..................... 10-2002-0066184

(51) Int. Cl.
*C09D 183/05* (2006.01)
*C09D 183/06* (2006.01)

(52) U.S. Cl. ........................ 106/122; 524/588; 524/58; 524/56; 524/57; 524/607; 524/27; 525/474; 525/420

(58) Field of Classification Search ................ 106/122; 524/27, 56, 57, 58, 588, 607; 525/474, 420
See application file for complete search history.

(56) References Cited

U.S. PATENT DOCUMENTS

| | | | | |
|---|---|---|---|---|
| 3,615,272 | A | | 10/1971 | Collins et al. |
| 4,399,266 | A | | 8/1983 | Matsumura et al. |
| 4,999,397 | A | | 3/1991 | Weiss et al. |
| 5,807,951 | A | * | 9/1998 | Konishi et al. ............. 527/300 |
| 5,965,679 | A | | 10/1999 | Godschalx et al. |
| 6,093,636 | A | | 7/2000 | Carter et al. |
| 6,107,357 | A | | 8/2000 | Hawker et al. |
| 6,114,458 | A | | 9/2000 | Hawker et al. |
| 6,231,989 | B1 | | 5/2001 | Chung et al. |
| 6,319,404 | B1 | * | 11/2001 | Zhang et al. .......... 210/500.29 |
| 6,632,748 | B1 | * | 10/2003 | Yim et al. .................. 438/780 |
| 2005/0031791 | A1 | * | 2/2005 | Sasaki et al. ............ 427/372.2 |

FOREIGN PATENT DOCUMENTS

| | | | |
|---|---|---|---|
| JP | 11-322992 | * | 5/1998 |
| TW | 2003/00786 | * | 6/2003 |

OTHER PUBLICATIONS

Abstract JP 11-322992, May 1998.*
English language abstract, TW 2003/00786 Jun. 16, 2003.*

* cited by examiner

*Primary Examiner*—Margaret G. Moore
(74) *Attorney, Agent, or Firm*—Harness, Dickey & Pierce, P.L.C.

(57) ABSTRACT

A composition for preparing a porous interlayer dielectric thin film which includes a saccharide or saccharide derivative, a thermo-stable organic or inorganic matrix precursor, and a solvent for dissolving the two solid components. Also provided is a dielectric thin film having evenly distributed nano-pores with a diameter of less than 50 Å, which is required for semiconductor devices.

13 Claims, 2 Drawing Sheets

COMPOSITION FOR PREPARING POROUS DIELECTRIC THIN FILM CONTAINING SACCHARIDES POROGEN

BACKGROUND OF THE INVENTION

This non-provisional application claims priority under 35 U.S.C. § 119(a) on Patent Application No. 2002-66184 filed in Korea on Oct. 29, 2002, which is herein incorporated by reference.

FIELD OF THE INVENTION

The present invention relates to a composition for preparing a porous interlayer dielectric thin film containing saccharides porogen. More specifically, the present invention relates to a composition comprising saccharide derivatives as porogen, capable of forming nano-pores with a diameter of less than 50 Å and a process for preparing a porous semiconductor interlayer dielectric thin film in a semiconductor device.

DESCRIPTION OF THE RELATED ART

Substances having nano-pores have been known to be useful in various fields as absorbents, carriers for catalysts, thermal insulators and electric insulators. In particular, they have been recently reported to be useful as materials for insulating films between interconnect layers of semiconductor devices. As the integration level has been increased in semiconductor devices, the performance of such devices is determined by the speed of the wires. Accordingly, the storage capacity of an interconnect thin film is required to be lowered to decrease the resistance and capacity in wires. For this purpose, there have been attempts to use materials with a low dielectric constant in the insulating film. For example, U.S. Pat. Nos. 3,615,272, 4,399,266 and 4,999,397 disclose polysilsesquioxanes with a dielectric constant of 2.5~3.1 which can be used in Spin On Deposition (SOD), as an alternative to $SiO_2$ with a dielectric constant of 4.0 which has been used in Chemical Vapor Deposition (CVD). In addition, U.S. Pat. No. 5,965,679 describes organic high molecules such as polyphenylenes with a dielectric constant of 2.65~2.70. However, the dielectric constants of the previous matrix materials are not sufficiently low to achieve a very low dielectric constant of less than 2.50 required for high-speed devices.

To solve this problem, there have been various trials to incorporate air bubbles into these organic and inorganic matrixes on a nano-scale. In this connection, U.S. Pat. No. 6,231,989 B1 describes a method of forming a porous thin film by the treatment of ammonia through the mixing with a high boiling point solvent, for forming pores on the hydrogen silsesquioxane. Further, U.S. Pat. Nos. 6,114,458, 6,107,357 and 6,093,636 disclose a method for preparing very low dielectric constant substances comprising the steps of: degrading vinyl-based high molecular dendrimer porogen in a heating step following the same method that is disclosed in U.S. Pat. No. 6,114,458; i.e., mixing the dendrimer porogen with an organic or inorganic matrix; making a thin film using this mixture; and decomposing the porogens contained in the mixture at a high temperature to form nano-pores.

However, the porous substances produced by such methods have a problem that their pore sizes are as large as 50~100 Å in diameter and the distribution thereof is non-uniform.

SUMMARY OF THE INVENTION

A feature of the present invention is to provide a composition for preparing dielectric thin films wherein a number of pores with a diameter of less than 50 Å are uniformly distributed therein.

Another feature of the present invention is to provide a method for forming dielectric thin film between interconnect layers in semiconductor devices, which have a dielectric constant k of 2.5 or less, by using said composition.

In accordance with one aspect of the present invention, there is provided a composition for preparing substances having porous interlayer dielectric thin films, said composition comprising a saccharide or saccharide derivative; a thermo-stable organic or inorganic matrix precursor; and a solvent for dissolving both the saccharide or saccharide derivative and the matrix precursor.

In accordance with another aspect of the present invention, there is provided a method for forming dielectric thin films between interconnect layers in semiconductor devices, said method comprising: coating a composition comprising a saccharide or saccharide derivative, a thermo-stable organic or inorganic matrix precursor, and a solvent for dissolving both the saccharide or saccharide derivative and the matrix precursor on a substrate through spin-coating, dip-coating, spray-coating, flow-coating, or screen-printing; evaporating the solvent therefrom; and heating the coating film at 150~600° C. in an inert gas atmosphere or under vacuum conditions.

In accordance with still another aspect of the present invention, there is provided a substance having nano-pores, said substance being prepared by using the composition comprising a saccharide or saccharide derivative, a thermo-stable organic or inorganic matrix precursor, and a solvent for dissolving both the saccharide or saccharide derivative and the matrix precursor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
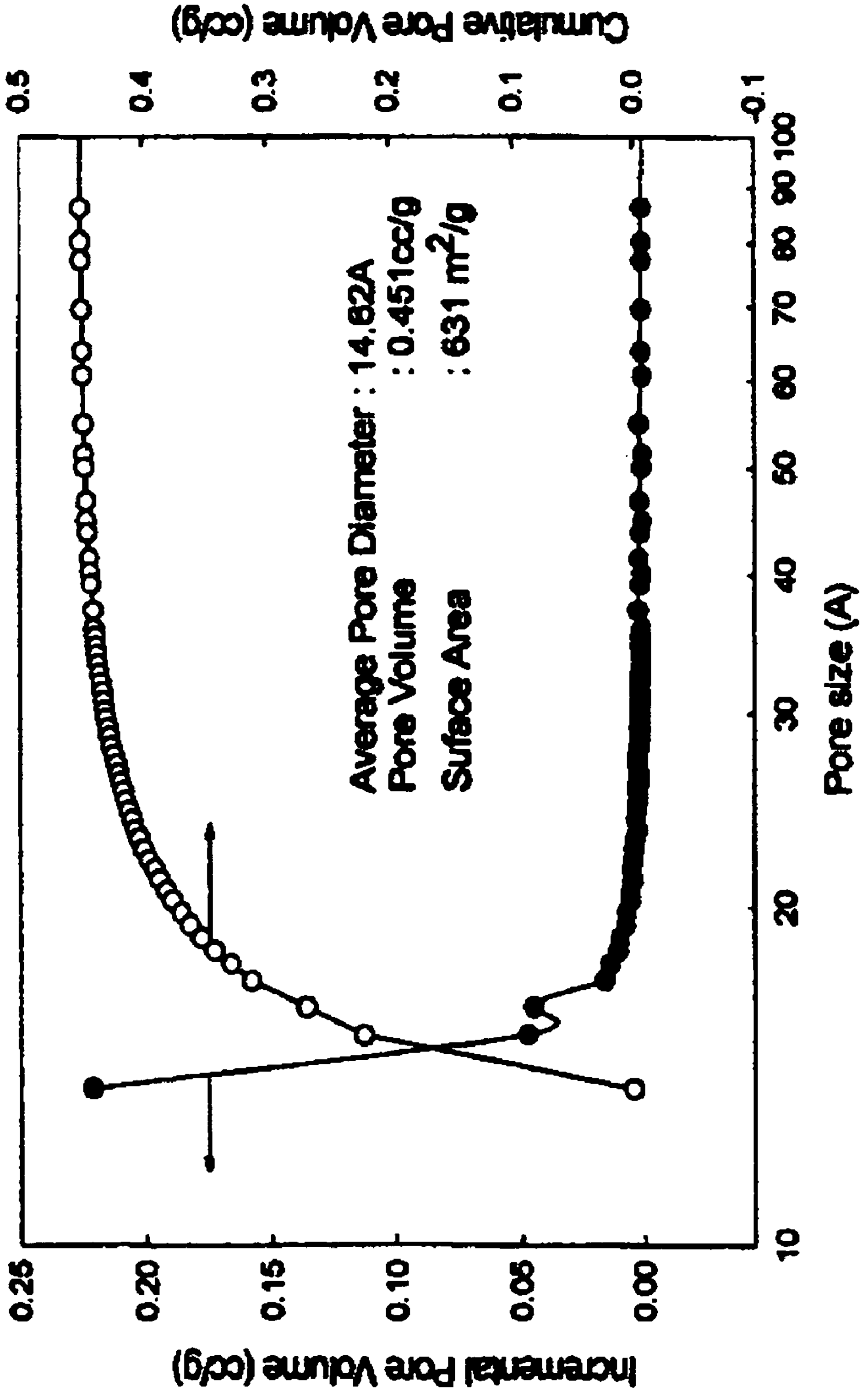
FIG. 1 is a graph showing the pore size distribution of the thin film prepared in Example 6-3.

Hereinafter, the present invention will be explained in more detail in the following Examples with reference to the accompanying drawings.

According to the present invention, there is provided novel substances having evenly distributed nano-pores with a diameter less than 50 Å, wherein said substances are made from a composition comprising thermo-stable organic or inorganic matrix precursors and thermo-unstable saccharide derivatives. These substances can be applied to a range of uses, including as absorbent, carriers for catalysts, thermal insulators, electrical insulators, and low dielectrics. In particular, these substances can be used to form thin films having a very low dielectric constant, as insulating films between interconnect layers in semiconductor devices.

The thermo-stable matrix precursors used in the composition of the present invention may be organic or inorganic high molecules having a glass transition temperature higher than 400° C.

Examples of such inorganic high molecules include, without limitation, (1) silsesquioxane, (2) alkoxy silane sol with a number average molecular weight of 500~20,000, derived from the partial condensation of $SiOR_4$, $RSiOR_3$ or $R_2SiOR_2$(R is an organic substituent), (3) a polysiloxane with a number average molecular weight of 1000~1000,000 derived from the partial condensation of more than one kind of cyclic or cage structure-siloxane monomer selectively mixed with more than one kind of silane based-monomer such as $Si(OR)_4$, $Rsi(OR)_3$ or $R_2Si(OR)_2$(R is an organic substituents).

Particularly, the silsesquioxane can be exemplified by hydrogen silsesquioxane, alkyl silsesquioxane, aryl silsesquioxane, and copolymers of these silsesquioxanes.

In addition, organic high molecules which cure into stable reticular structures at a high temperature are also preferred as matrix precursors. Non-limiting examples of the organic high molecules include polyimide-based polymers, which can be imidized, such as poly (amic acid), poly (amic acid ester), etc.; polybenzocyclobutene-based polymers; and polyarylene-based polymers such as polyphenylene, poly (arylene ether), etc.

In the present invention, the matrix precursor is more preferably an organic polysiloxane, having a Si—OH content of at least 10 mol %, preferably 25 mol % or more, which is prepared through hydrolysis and polycondensation of at least one siloxane monomer having a cyclic or cage structure by using an acidic catalyst and water in the presence of a solvent, and selectively mixing with at least one silane monomer such as $Si(OR)_4$, $Rsi(OR)_3$ or $R_2Si(OR)_2$ (R is organic substituents). The mole ratio of the siloxane monomer having either a cyclic or cage structure to the silane monomer is 0.99:0.01~0.01:0.99, more preferably 0.8:0.2~0.1:0.9, preferably 0.6:0.4~0.2:0.8 range.

The siloxane monomer having a cyclic structure can be represented by the following formula (1):

(1)

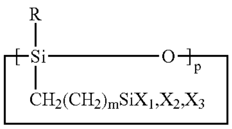

In the above formula (1),

R is a hydrogen atom, a $C_{1\sim3}$ alkyl group, a $C_{3\sim10}$ cycloalkyl group, or a $C_{6\sim15}$ aryl group;

$X_1$, $X_2$ and $X_3$ are independently $C_{1\sim3}$ alkyl group, a $C_{1\sim10}$ alkoxy group, or a halogen atom, and at least one of them is a hydrolysable group;

p is an integer ranging from 3 to 8; and m is an integer ranging from 0 to 10.

The method for preparing the cyclic siloxane monomers is not specifically limited, but hydrosilylation using a metal catalyst is preferred. The siloxane monomers having cage structure can be represented by the following formulas (2) to (4):

(2)

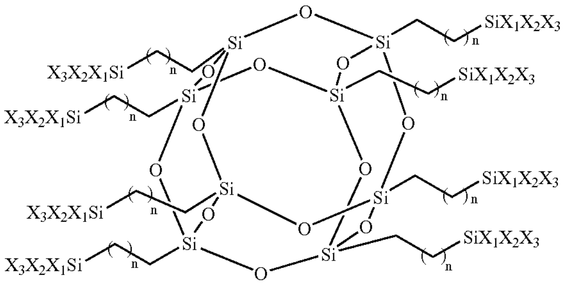

(3)

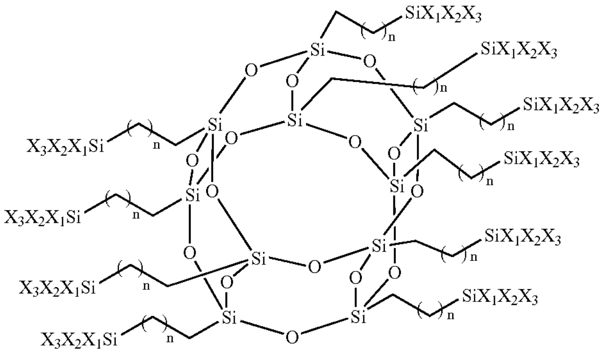

-continued (4)

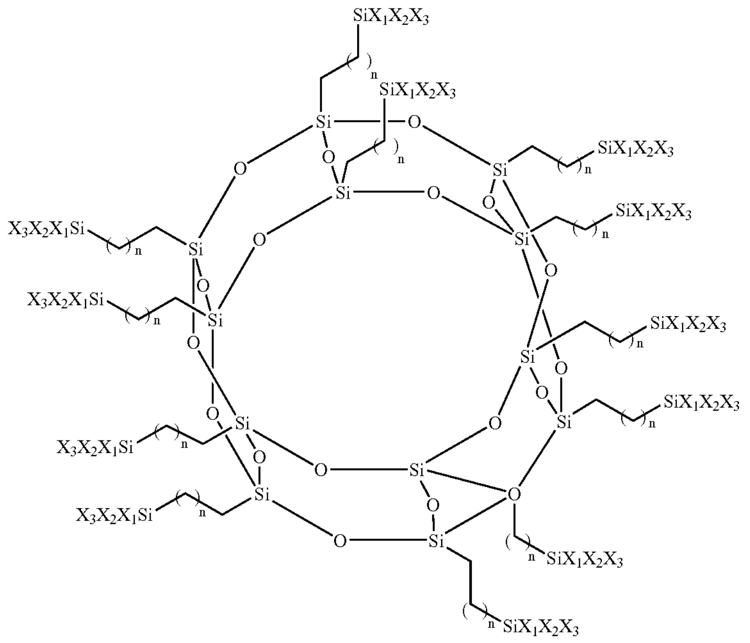

In the above formulas (2) to (4), $X_1$, $X_2$ and $X_3$ are independently $C_{1\sim3}$ alkyl group, a $C_{1\sim10}$ alkoxy group, or a halogen atom, and at least one of them is hydrolysable; and n is an integer ranging from 1 to 12.

As can be seen from the above formulas (2) to (4), silicon atoms are linked to each other though oxygen atoms to form cyclic structure, and the end of each branch comprises organic groups constituting a hydrolysable substituent.

The method of preparing siloxane monomers having a cage structure is not specially limited, but hydrosilylation using a metallic catalyst is preferred.

The silane-based monomers can be represented by the following formulas (5) to (7):

$SiX_1X_2X_3X_4$ (5)

$RSiX_1X_2X_3$ (6)

$R_1R_2SiX_1X_2$ (7)

In the above formulas (5) to (7), $R_1$ and $R_2$ are respectively a hydrogen atom, a $C_{1\sim3}$ alkyl group, a $C_{3\sim10}$ cycloalkyl group, or a $C_{6\sim15}$ aryl group; and $X_1$, $X_2$, $X_3$ and $X_4$ are independently a $C_{1\sim3}$ alkyl group, a $C_{1\sim10}$ alkoxy group, or a halogen atom.

The catalyst used in the condensation reaction for preparing the monomer matrix is not specifically limited, but preferably hydrochloric acid, benzenesulfonic acid, oxalic acid, formic acid, or mixtures thereof.

In the hydrolysis and polycondensation reaction, water is added at 1.0~100.0 equivalents, preferably 1.0~10.0 equivalents per one equivalent of reactive groups in the monomers, and the catalyst is added at 0.00001~10 equivalents, preferably 0.0001~5 equivalents per one equivalent of the reactive groups in the monomers, and then the reaction is carried out at 0~200° C., preferably 50~110° C. for 1~100 hrs, preferably 5~24 hrs. In addition, the organic solvent used in this reaction is preferably an aromatic hydrocarbon solvent such as toluene, xylene, mesitylene, acetone, etc.; ketone-based solvent such as methyl isobutyl ketone, acetone, etc.; ether-based solvent such as tetrahydrofuran, isopropyl ether, etc.; acetate-based solvent such as propylene glycol monomethyl ether acetate; amide-based solvent such as dimethylacetamide, dimethylformamide, etc.; γ-butyrolactone; silicon solvent; or a mixture thereof.

The thermo-unstable porogens used in the present invention are monomeric, dimeric, polymeric saccharides or a derivative thereof comprising 1~22 of hexacarbon saccharides.

Concrete examples are monosaccharides such as glucose derivatives represented by the following formula (8), galactose derivatives represented by the following formula (9), and fructose derivatives representative by the following formula (10):

(8)

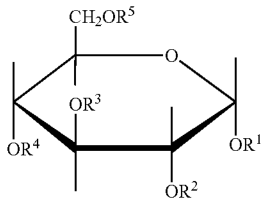

(9)

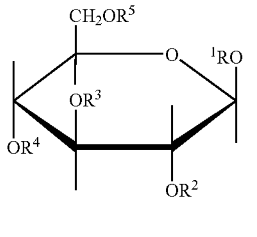

-continued (10)

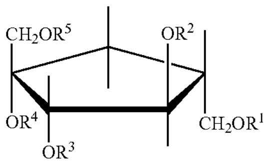

In the above formulas (8) to (10), $R_1$, $R_2$, $R_3$, $R_4$ and $R_5$ are independently a hydrogen atom, a $C_{2\sim30}$ acyl group, a $C_{1\sim20}$ alkyl group, a $C_{3\sim10}$ cycloalkyl group, a $C_{6\sim30}$ aryl group, a $C_{1\sim20}$ hydroxy alkyl group, or a $C_{1\sim20}$ carboxyl group.

Other examples of the porogen used in the present invention is disaccharides such as lactose derivatives represented by the following formula (11), maltose derivatives represented by the following formula (12), disaccharide-based sucrose derivatives represented by the following formula (13).

(11)

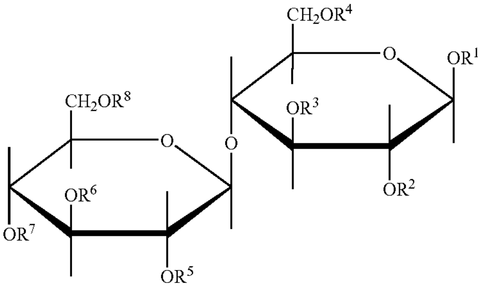

(12)

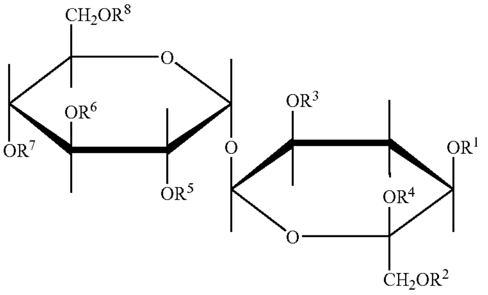

(13)

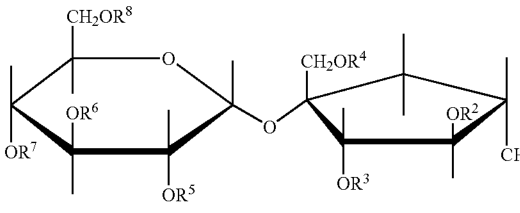

In the above formulas (11) to (13), $R_1$, $R_2$, $R_3$, $R_4$, $R_5$, $R_6$, $R_7$ and $R_8$ are independently a hydrogen atom, a $C_{2\sim30}$ acyl group, a $C_{1\sim20}$ alkyl group, a $C_{3\sim10}$ cycloalkyl group, a $C_{6\sim30}$ aryl group, a $C_{1\sim20}$ hydroxy alkyl group, and a $C_{1\sim20}$ carboxy alkyl group.

Yet another examples of the porogen used in the present invention is polysaccharide represented by the following formula (14).

(14)

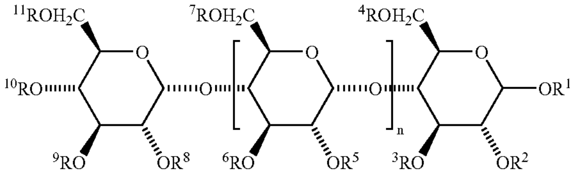

In the above formula (14), $R_1$, $R_2$, $R_3$, $R_4$, $R_5$, $R_6$, $R_7$, $R_8$, $R_9$, $R_{10}$ and $R_{11}$ are independen hydrogen atom, a $C_{2\sim30}$ acyl group, a $C_{1\sim20}$ alkyl group, a $C_{3\sim10}$ cycloalkyl group, a $C_{6\sim30}$ aryl group, a $C_{1\sim20}$ hydroxy alkyl group, or a $C_{1\sim20}$ carboxyl group and n is an integer ranging from 1 to 20.

Specific examples of the porogen include, but are not limited to, glucose, glucopyranose pentabenzoate, glucose pentaacetate, galactose, galactose pentaacetate, fructose, sucrose, sucrose octabenzoate, sucrose octaacetate, maltose, lactose, etc.

The content of the saccharide is preferably 0.1~95 wt. %, more preferably 10~70 wt. % of the solid components (matrix precursor+porogen). If the porogen is used in an amount of more than 70 wt. % there is the problem that the thin film cannot be used as an interlayer insulator because the mechanical property of the film is reduced. To the contrary, if the porogen is used in an amount of less than 10 wt. %, the dielectric constant of the film is not lowered due to the lowered generation of pores.

In the present invention, the composition for producing substances having nano-pores may be prepared by dissolving the above mentioned thermo-stable matrix precursors and a saccharide or saccharide derivative in an appropriate solvent. Examples of this solvent include, but are not limited to, aromatic hydrocarbons such as anisole, mesitylene and xylene; ketones such as methyl isobutyl ketone, 1-methyl-2-pyrrolidinone and acetone; ethers such as tetrahydrofuran and isopropyl ether; acetates such as ethyl acetate, butyl acetate and propylene glycol methyl ether acetate; amides such as dimethylacetamide and dimethylformamide; γ-butyolactone; silicon solvents; and mixtures thereof.

The solvent should be used in a sufficient amount to fully coat the substrate with the two solid components (matrix precursor+the saccharide or saccharide derivative), and may be present in the range of 20~99.9 wt. % in the composition, preferably 50~95 wt. %. If the solvent is used in an amount of less than 20 wt. %, there is the problem that a thin film is not evenly formed due to the high viscosity. To the contrary, if the solvent is used in an amount of more than 99.9 wt. %, the thickness of the film is too thin.

According to the present invention, the thin film having nano-pores is formed on a substrate by the use of the composition of the present invention, and serves as a good interlayer insulating film required for semiconductor devices. The composition of the present invention is first coated onto a substrate through spin-coating, dip-coating, spray-coating, flow-coating, screen-printing and so on. More preferably, the coating step is carried out by spin-coating at 1000~5000 rpm. Following the coating, the solvent is evaporated from the substrate whereby a resinous film is deposited on the substrate. At this time, the evaporation may be carried out by simple air-drying, or by subjecting the substrate, at the beginning of curing step, to vacuum condition or mild heating (≦100° C.). The resulting resinous coating film may be cured by heating at a temperature of 150~600° C., more preferably 200~450° C. wherein pyrolysis of the saccharide porogen occurs, so as to provide an insoluble film without cracks. As used herein, the expression "film without cracks" is meant a film without any cracks observed with an optical microscope at a magnification of 1000×. As used herein, by "an insoluble film" is meant a film, which is substantially insoluble in any solvent described as being useful for the coating and deposition of the siloxane-based resin. The heat-curing of the coating film may be performed in an inert gas (nitrogen, argon, etc.) atmosphere or under vacuum conditions for up to 10 hrs, preferably 30 min to 2 hrs.

After curing, fine pores with diameters of less than 50 Å are formed in the matrix. Even finer pores with a diameter of less than 30 Å may be evenly formed, for example, through chemical modification of the saccharide porogen.

The thin film so obtained has a low dielectric constant (k≦2.5). Further, in the case that 30 weight parts of the saccharide porogen are mixed with 70 weight parts of the matrix precursor (i.e., content of the saccharide is 30 wt. % of the solid mixture), a very low dielectric constant (k≦2.2) may be also achieved.

Hereinafter, the present invention will be described in more detail with reference to the following Examples. However, these Examples are given for the purpose of illustration only and are not to be construed as limiting the scope of the invention.

EXAMPLE 1

Synthesis of Matrix Monomers

EXAMPLE 1-1

Synthesis of Matrix Monomer A

To a flask were added 29.014 mmol (10.0 g) of 2,4,6,8-tetramethyl-2,4,6,8-tetravinylcyclotetrasiloxane and 0.164 g of platinum (O)-1,3-divinyl-1,1,3,3-tetramethyldisiloxane complex (solution in xylene), and then diluted with 300 ml diethylether. Next, the flask was cooled to −78° C., 127.66 mmol (17.29 g) trichlorosilane was slowly added thereto, and then the flask was slowly warmed to room temperature. The reaction was continued at room temperature for 20 hrs, and any volatile materials were removed from the reaction mixture under reduced pressure of about 0.1 torr. To the mixture was added 100 ml pentane and stirred for 1 hr, and then the mixture was filtered through celite to provide a clear colorless solution. The pentane was evaporated from the solution under reduced pressure of about 0.1 torr to afford a colorless liquid compound, $[\text{—Si }(CH_3)(CH_2CH_2Si\ Cl_3)O\text{—}]_4$ in a yield of 95%. 11.28 mmol (10.0 g) of the compound was diluted with 500 ml tetrahydrofuran, and 136.71 mmol (13.83 g) triethylamine was added thereto. Thereafter, the mixture was cooled to −78° C., 136.71 mmol (4.38 g) methyl alcohol was slowly added thereto, and it was slowly warmed again to room temperature. The reaction was continued at room temperature for 15 hrs followered by filtration of the product mixture through celite, and then volatile materials were evaporated from the filtrate under reduced pressure of about 0.1 torr. Subsequently, 100 ml pentane was added thereto and stirred for 1 hr, and then the mixture was filtered through celite to provide a clear colorless solution. The pentane was evaporated from this solution under reduced pressure of about 0.1 torr to afford monomer A represented by the following formula (15) as a colorless liquid in a yield of 94%:

(15)

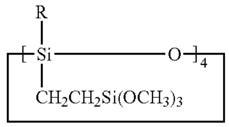

EXAMPLE 2

Synthesis of Matrix Precursors

EXAMPLE 2-1

Precursor A: Homopolymerization of Monomer A

To a flask was added 9.85 mmol (8.218 g) monomer A, and then diluted with 90 ml tetrahydrofuran. Next, dil. HCl solution (1.18 mmol hydrochloride) prepared by mixing of 8.8 ml conc. HCl (35 wt. % hydrochloride) with 100 ml D.I.-water was slowly added thereto at −78° C., followed by addition of more D.I.-water, so that total amount of water including the inherent water in the above added dil. HCl solution might be 393.61 mmol (7.084 g). Thereafter, the flask was slowly warmed to 70° C., and allowed to react for 16 hrs. Then, the reaction mixture was transferred to a separatory funnel, 90 ml diethylether was added thereto, and then rinsed with 100 ml D.I.-water 5 times. Subsequently, 5 g anhydrous sodium sulfate was added thereto and stirred at room temperature for 10 hrs to remove a trace of water, and then filtered out to provide a clear colorless solution. Any volatile materials were evaporated from this solution under reduced pressure of about 0.1 torr to afford 5.3 g of precursor A as white powder.

EXAMPLE 2-2

Precursor B: Copolymerization of Monomer A and Methyltrimethoxysilane

To a flask were added 37.86 mmol (5.158 g) methyltrimethoxysilane and 3.79 mmol (3.162 g) monomer A, and then diluted with 100 ml tetrahydrofuran. Next, dil. HCl solution (0.0159 mmol hydrochloride) prepared by dilution of 0.12 ml conc. HCl (35 wt. % hydrochloride) with 100 ml D.I.-water was slowly added thereto at −78° C., followed by addition of more D.I.-water, so that total amount of water including the inherent water in the above added dil. HCl solution may be 529.67 mmol (9.534 g). Thereafter, the flask was slowly warmed to 70° C., and allowed to react for 16 hrs. Then, the reaction mixture was transferred to a separatory funnel, 100 ml diethylether was added thereto, and then rinsed with 100 ml D.I.-water five times. Subsequently, 5 g anhydrous sodium sulfate was added thereto and stirred at room temperature for 10 hrs to remove a trace of water, and then filtered out to provide a clear colorless solution. Any volatile materials were evaporated from this solution under reduced pressure of about 0.1 torr to afford 5.5 g of precursor B as white powder.

EXAMPLE 2-3

Precursor C: Copolymerization of Monomer A and Tetramethoxy Silane

To a flask were added 13.28 mmol (11.08 g) monomer A and 2.39 mmol (2.00 g) tetramethoxy silane, and then diluted with 100 ml tetrahydrofuran. Next, dil. HCl solution (0.0159 mmol hydrochloride) prepared by dilution of 0.12 ml conc. HCl (35 wt. % hydrochloride) with 100 ml D.I.-water was slowly added thereto at −78° C., followed by addition of more D.I.-water, so that total amount of water including the inherent water in the above added dil. HCl solution may be 529.67 mmol (9.534 g). Thereafter, the flask was warmed to 70° C., and allowed to react for 16 hrs. Then, the reaction mixture was transferred to a separatory funnel 100 ml diethylether was added thereto, and then rinsed with 100 ml D.I.-water five times. Subsequently, 5 g of anhydrous sodium sulfate was added thereto and stirred at room temperature for 10 hrs to remove a trace of water, and then filtered out to provide a clear colorless solution. Any volatile materials were evaporated from this solution under reduced pressure of about 0.1 torr to afford 6.15 g of precursor C as white powder.

EXAMPLE 3

Analysis of the Prepared Precursors

The siloxane-based resinous precursors thus prepared were analyzed for weight average molecular weight (hereinafter, referred to as "MW") and molecular weight distribution (hereinafter, referred to as "MWD") by means of gel permeation chromatography (Waters Co.), and the Si—OH, Si—$OCH_3$ and Si—$CH_3$ contents (mol %) of their terminal groups were analyzed by means of NMR analysis (Bruker Co.). The results are set forth in the following Table 1.

TABLE 1

| Precursor | MW | MWD | Si—OH (%) | Si—$OCH_3$ (%) | Si—$CH_3$ (%) |
|---|---|---|---|---|---|
| Precursor (A) | 60800 | 6.14 | 35.0 | 1.2 | 63.8 |
| Precursor (B) | 4020 | 2.77 | 39.8 | 0.5 | 59.7 |
| Precursor (C) | 63418 | 6.13 | 26.3 | 0.7 | 73.0 |

Si—OH(mol %)=Area(Si—OH)÷[Area(Si—OH)+Area(Si—$OCH_3$)/3+Area(Si—$CH_3$)/3]×100

Si—$OCH_3$(mol %)=Area(Si—$OCH_3$)/3÷[Area(Si—OH)+Area(Si—$OCH_3$)/3+Area(Si—$CH_3$)/3]×100

Si—$CH_3$(mol %)=Area(Si—$CH_3$)/3÷[Area(Si—OH)+Area(Si—$OCH_3$)/3+Area(Si—$CH_3$)/3]×100_

EXAMPLE 4

Determination of Thickness and Refractive Index of the Thin Film Made From the Substance Having Nano-Pores The resinous compositions of the present invention were prepared by mixing the siloxane-based resinous matrix precursor obtained from the above Example 2 together with saccharide based-porogen and propylene glycol methyl ether acetate (PGMEA) in accordance with the particular ratios as described in the following Table 2. These compositions were applied to spin-coating at 3000 rpm onto p-type silicon wafers doped with boron. The substrates thus coated were then subjected to a series of soft baking on a hot plate for 1 min at 150° C. and another min at 250° C., so that the organic solvent might be sufficiently removed. Then, the substrates were cured in a Linberg furnace at 420° C. for 60 mins under vacuum condition. Thereafter, the thickness of each resulting low dielectric film was determined by using prism coupler and the refractive index determined by using prism coupler and ellipsometer. The results are set forth in the following Table 2.

TABLE 2

| Example | Matrix precursor | Porogen | Mat.[(1)] (wt. %) | CD[(2)] (wt. %) | Thickness (Å) | Dielectric constant (k) |
|---|---|---|---|---|---|---|
| Example 4-1 | Precursor A | Not added | 25.0 | — | 8245 | 1.437 |
| Example 4-2 | Precursor A | Sucrose octabenzoate | 25.0 | 30 | 8637 | 1.328 |
| Example 4-3 | Precursor B | Not added | 30.0 | — | 10424 | 1.414 |
| Example 4-4 | Precursor B | Sucrose octabenzoate | 30.0 | 30 | 11764 | 1.304 |
| Example 4-5 | Precursor C | Not added | 25.0 | — | 11340 | 1.440 |
| Example 4-6 | Precursor C | Glucose pentaacetate | 25.0 | 35 | 10247 | 1.418 |
| Example 4-7 | Precursor C | Sucrose octaacetate | 25.0 | 35 | 13942 | 1.318 |
| Example 4-8 | Precursor C | Sucrose octabenzoate | 25.0 | 35 | 8578 | 1.298 |

Mat.[1] (wt. %)=[weight of matrix precursor($g$)+weight of porogen($g$)]/[weight of PGMEA($g$)+weight of precursor($g$)+weight of porogen($g$)]×100

CD[2] (wt. %)=weight of porogen($g$)/[weight of porogen($g$)+weight of matrix precursor($g$)]×100

EXAMPLE 5

Preparing Determiner of Dielectric Constant of the Thin Film and Determination of Dielectric Constant of the Thin Film To determine the dielectric constant of the porous thin film, 3000 Å thickness silicon thermo oxide film were applied onto p-type silicon wafers doped with boron, then 100 Å titanium, 2000 Å aluminum were deposited by metal evaporator. Subsequently, low dielectric films in composition of Table 3 were coated as example 4. Thereafter, 1 mm diameter circular aluminum thin film is deposited at 2000 Å thickness by the hard mask designed to have 1 mm electrode diameter to complete [MIM (Metal-insulator-metal)]-dielectric constant determiner in [MIM (Metal-insulator-metal)] structure. Capacitance of these thin films was measured by PRECISION LCR METER (HP4284A) with Probe station (Micromanipulator 6200 probe station), at 100 Hz frequency. The thickness of thin film measured by a prism coupler is substituted into following equation, to provide the electric constant.

$k=(C\times d)/(\epsilon_0\times A)$ k: dielectric constant

C: capacitance d: the thickness of the low dielectric thin film $\epsilon_0$: dielectric constant in vacuum A: the contact area of electrode

TABLE 3

| Example | Matrix precursor | Porogen | Mat. (wt. %) | CD (wt. %) | Pore Content[1] (%) | Dielectric constant (k) |
|---|---|---|---|---|---|---|
| Example 5-1 | Precursor B | Not added | 25.0 | — | — | 2.75 |
| Example 5-2 | Precursor B | Sucrose octabenzoate | 25.0 | 10 | 4.1 | 2.52 |
| Example 5-3 | Precursor B | Sucrose octabenzoate | 25.0 | 20 | 10.9 | 2.19 |
| Example 5-4 | Precursor B | Sucrose octabenzoate | 25.0 | 30 | 20.5 | 2.01 |
| Example 5-5 | Precursor C | Not added | 25.0 | — | — | 2.92 |
| Example 5-6 | Precursor C | Glucose pentaacetate | 25.0 | 35 | 3.9 | 2.82 |
| Example 5-7 | Precursor C | Sucrose octaacetate | 25.0 | 35 | 10.7 | 2.56 |
| Example 5-8 | Precursor C | Sucrose octabenzoate | 25.0 | 35 | 27.0 | 1.94 |

Pore Content[1](%)=calculated from the refraction index measured by using prism coupler, by Lorentz-Lorentz equation

EXAMPL 6

Figure 2:
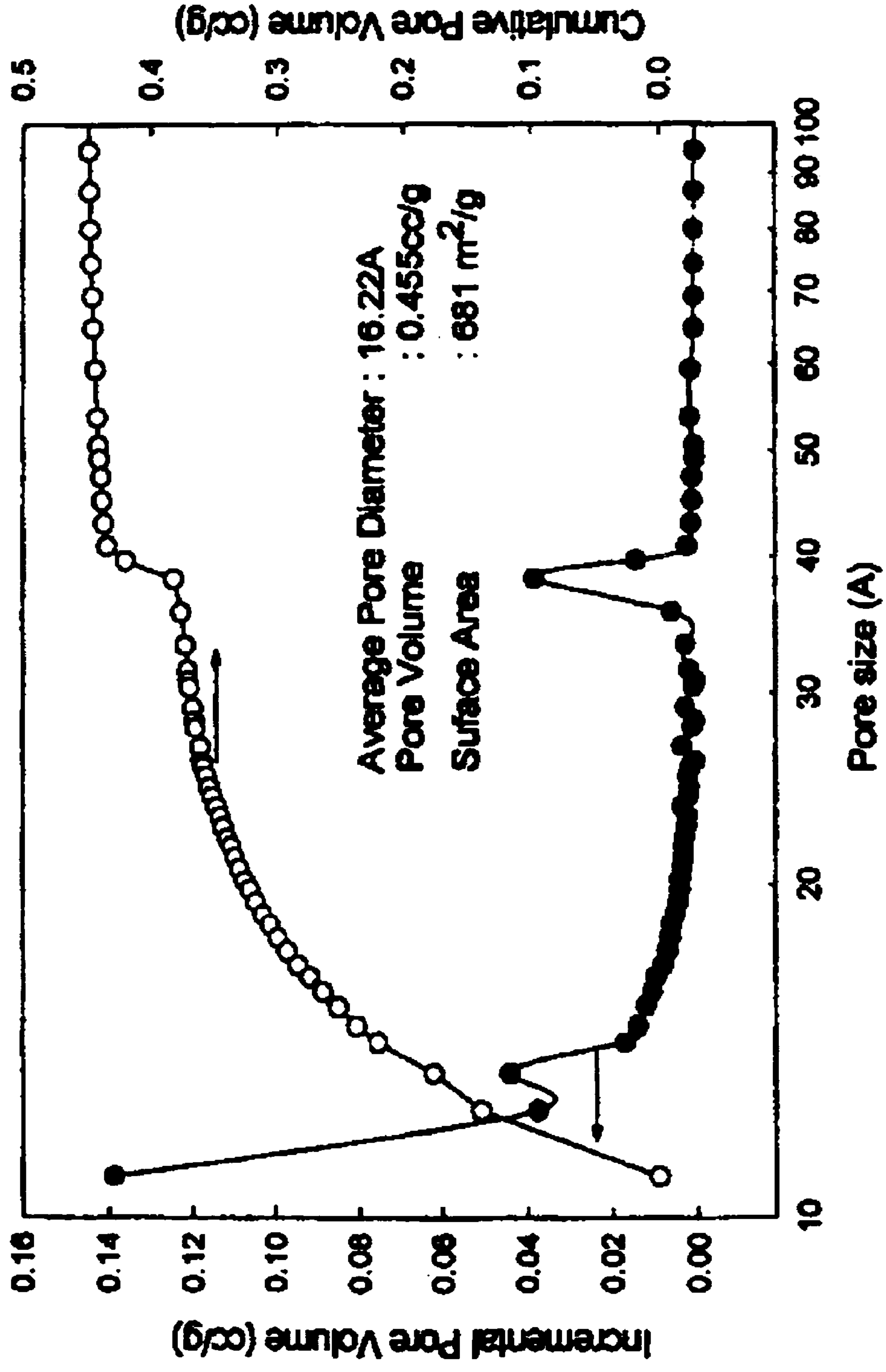
FIG. 2 is a graph showing the pore size distribution of the thin film prepared in Example 6-4.

Measuring of th Average Size and Siz Distribution of th Pores in the Prepared Porous Thin Film Nitrogen adsorption analysis with Surface Area Analyzer [ASAP2010, Micromeritics co.] was performed to analyze the pore structure of the thin films prepared by the same process as in Example 4 in the composition of following Table 4. Thin film has very small average size less than 20 Å as described in Table 4. FIG. 1 and FIG. 2 describe pore size distributions of the thin film prepared in Examples 6-3 and 6-4.

TABLE 4

| Example | Matrix precursor | Porogen | Mat. (wt. %) | CD (wt. %) | Average pore size(Å) | Volume of pore (cc/g) | Surface area ($m^2/g$) |
|---|---|---|---|---|---|---|---|
| Example 6-1 | Precursor C | Not added | 25.0 | — | 6.1 | 0.008 | 164 |

TABLE 4-continued

| Example | Matrix precursor | Porogen | Mat. (wt. %) | CD (wt. %) | Average pore size(Å) | Volume of pore (cc/g) | Surface area ($m^2/g$) |
|---|---|---|---|---|---|---|---|
| Example 6-2 | Precursor C | Glucose pentaacetate | 25.0 | 30.0 | 16.2 | 0.166 | 412 |
| Example 6-3 | Precursor C | Sucrose octabenzoate | 25.0 | 30.0 | 14.6 | 0.451 | 631 |
| Example 6-4 | Precursor C | Sucrose octabenzoate | 25.0 | 30.0 | 16.3 | 0.455 | 681 |

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A composition for preparing substances having a porous interlayer dielectric thin film, said composition comprising:

one or more of a monomeric saccharide derivative or an oligomeric saccharide derivative which is selected from the group consisting of monomeric saccharide derivatives represented by the following formulas (8) to (10), disaccharide derivatives represented by the following formulas (11) to (13) and a polymeric saccharide derivative represented by the following formula (14):

(8)

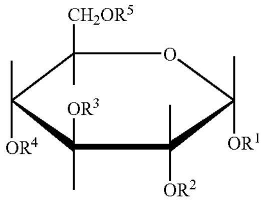

(9)

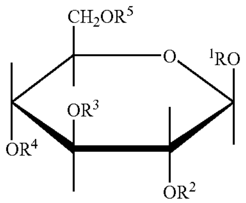

(10)

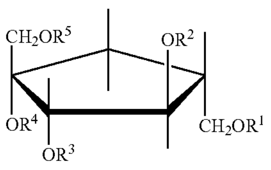

in which $R^1$, $R^2$, $R^3$, $R^4$ and $R^5$ are independently a $C_{2-30}$ acyl group, (11)

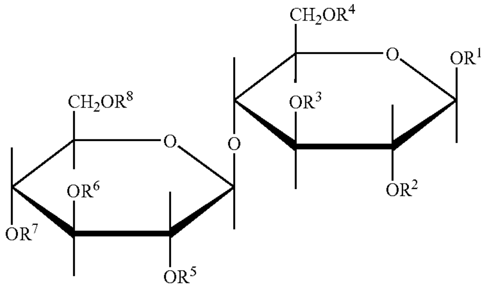

(12)

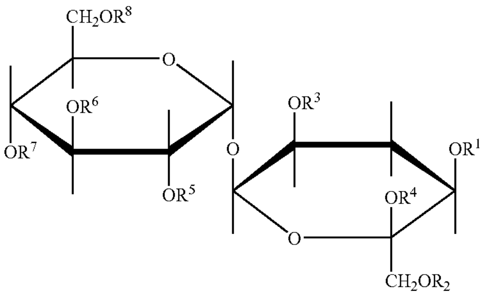

(13)

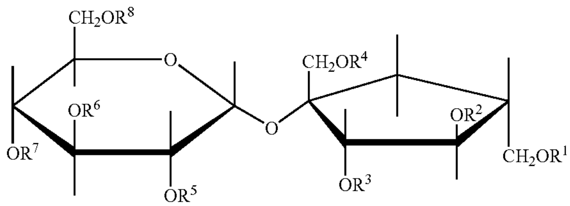

in which, $R^1$, $R^2$, $R^3$, $R^4$, $R^5$, $R^6$, $R^7$, and $R^8$ are independently a $C_{2-30}$ acyl group, or (14)

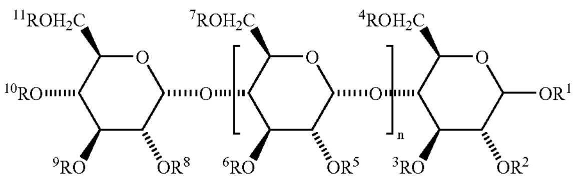

in which $R^1$, $R^2$, $R^3$, $R^4$, $R^5$, $R^6$, $R^7$, $R^8$, $R^9$, $R^{10}$ and $R^{11}$ are independently a $C_{2-30}$ acyl group;

a thermo-stable organic or inorganic matrix precursor; and a solvent for dissolving both the saccharide derivative and the matrix precursor.

2. The composition according to claim 1, wherein the content of the monomeric and the oligomeric saccharide derivative is 0.1~95 wt. % of the solid components (the matrix precursor+the saccharide derivative).

3. The composition according to claim 1, wherein the content of the solvent is 20.0~99.9 wt. % of the compositions (the matrix precursor+the saccharide derivative+the solvent).

4. The composition according to claim 1, wherein the monomeric saccharide or oligomeric saccharide derivative is glucopyranose pentabenzoate, glucose pentaacetate, galactose pentaacetate, sucrose octabenzoate, or sucrose octaacetate.

5. The composition according to claim 1, wherein the matrix precursor is silsesquioxane, alkoxysilane sol, or siloxane-based polymer.

6. The composition according to claim 5, wherein the silsesquioxane is hydrogen silsesquioxane, alkyl silsesquioxane, aryl silsesquioxane, or a copolymer thereof.

7. The composition according to claim 1, wherein the matrix precursor is a siloxane-based resin which is prepared by the hydrolysis and polycondensation of one or more monomers selected from the group consisting of compounds represented by the following formulas (1) to (4), using a catalyst and water in an organic solvent:

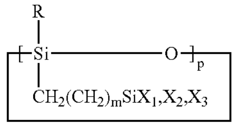

(1)

in which, R is a hydrogen atom, a $C_{1-3}$ alkyl group, a $C_{3-10}$ cycloalkyl group, or a $C_{6-15}$ aryl group;

$X_1$, $X_2$, and $X_3$ are independently a $C_{1-3}$ alkyl group, a $C_{1-10}$ alkoxy group, or a halogen atom, and at least one of them is a hydrolysable group;

p is an integer ranging from 3 to 8;

m is an integer ranging from 0 to 10; and

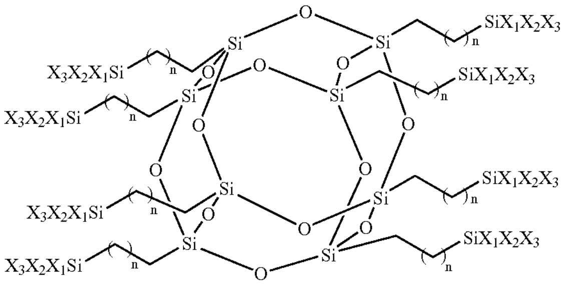

(2)

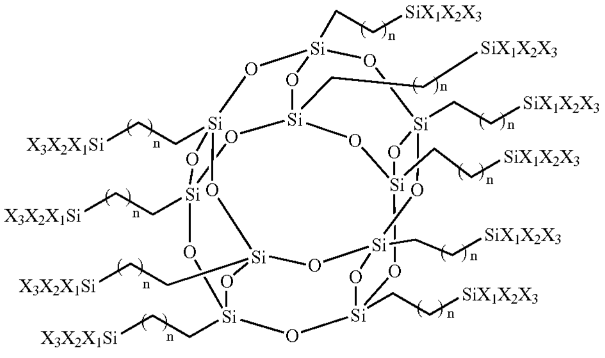

(3)

-continued (4)

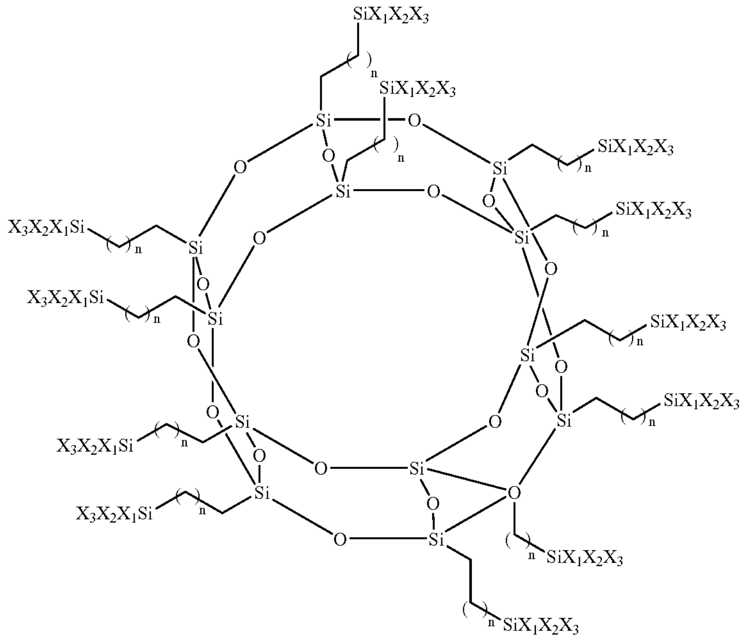

in which, $X_1$, $X_2$ and $X_3$ are independently a $C_{1-3}$ alkyl group, a $C_{1-10}$ alkoxy group, or a halogen atom, and at least one of them is hydrolysable; and n is an integer ranging from 1 to 12.

8. The composition according to claim 1, wherein the matrix precursor is a siloxane-based resin which is prepared by hydrolysis and polycondensation of a mixture of one or more monomers selected from the group consisting of compounds represented by the following formulas (1) to (4) together with one or more silane-based monomers selected from the group consisting of compounds represented by the following formulas (5) to (7) using a catalyst and water in an organic solvent:

(1)

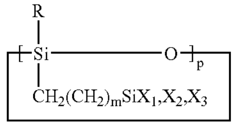

in which, R is a hydrogen atom, a $C_{1-3}$ alkyl group, a $C_{3-10}$ cycloalkyl group, or a $C_{6-15}$ aryl group;

$X_1$, $X_2$ and $X_3$ are independently a $C_{1-3}$ alkyl group, a $C_{1-10}$ alkoxy group, or a halogen atom, and at least one of them is a hydrolysable group;

p is an integer ranging from 3 to 8;

m is an integer ranging from 0 to 10; and (2)

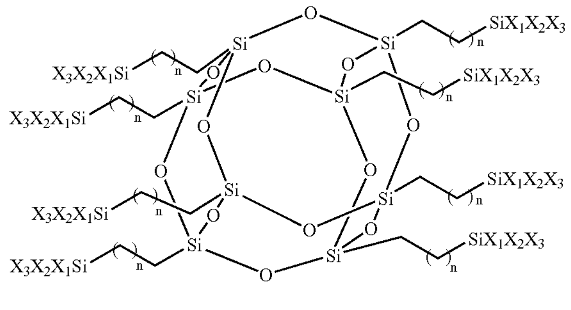

-continued (3)

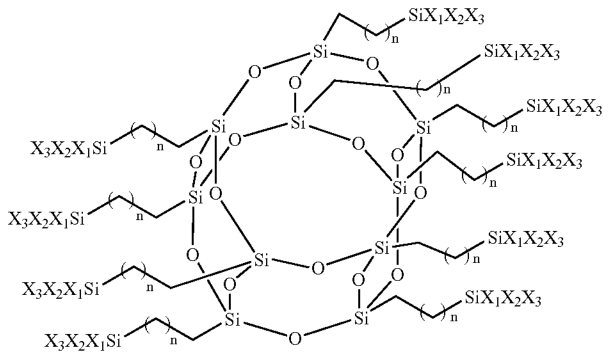

(4)

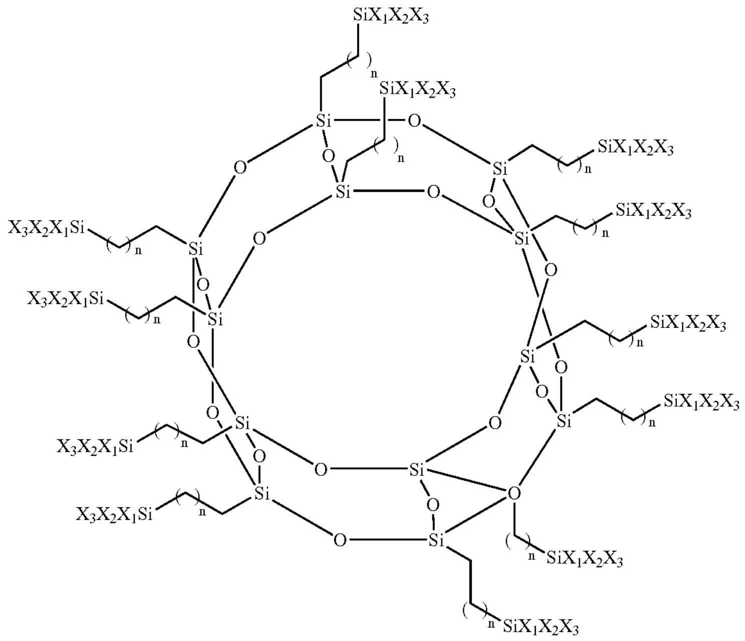

in which, $X_1$, $X_2$ and $X_3$ are independently a $C_{1-3}$ alkyl group, a $C_{1-10}$ alkoxy group, or a halogen atom, and at least one of them is hydrolysable;

n is an integer ranging from 1 to 12; and $$SiX_1X_2X_3X_4 \quad (5)$$

$$RSiX_1X_2X_3 \quad (6)$$

$$R_1R_2SiX_1X_2 \quad (7)$$

in which $R_1$ and $R_2$ are respectively a hydrogen atom, a $C_{1-3}$ alkyl group, a $C_{3-10}$ cycloalkyl group, or a $C_{6-15}$ aryl group; and $X_1$, $X_2$, $X_3$ and $X_4$ are independently a $C_{1-3}$ alkyl group, a $C_{1-10}$ alkoxy group, or a halogen atom.

9. The composition according to claim 7, wherein the content of the matrix precursor is more than 10 mol %.

10. The composition according to claim 8, wherein the content of the matrix precursor is more than 10 mol %.

11. The composition according to claim 8, wherein the mole ratio of the siloxane monomers having a cyclic or cage structure to the silane-based monomers is 0.99:0.0~10.01 :0.99.

12. The composition according to claim 1, wherein the matrix precursor is a polyimide, polybenzocyclobutene, a polyarylene, or a mixture thereof.

13. The composition according to claim 1, wherein the solvent is an aromatic hydrocarbon-based solvent, a ketone-based solvent, an ether-based solvent, an acetate-based solvent, an amide-based solvent, γ-butyrolactone, a silicon-based solvent, or a mixture thereof.

* * * * *